(12) United States Patent
Leschevin

(10) Patent No.: US 9,132,891 B2
(45) Date of Patent: Sep. 15, 2015

(54) TAILBUOY STABILIZATION DEVICE AND METHOD

(71) Applicant: CGG SERVICES SA, Massy Cedex (FR)

(72) Inventor: Marc Leschevin, Saint Ythaire (FR)

(73) Assignee: CGG SERVICES SA, Massy Cedex (FR)

( * ) Notice: Subject to any disclaimer, the term of this patent is extended or adjusted under 35 U.S.C. 154(b) by 0 days.

(21) Appl. No.: 14/070,891

(22) Filed: Nov. 4, 2013

(65) Prior Publication Data

US 2014/0196653 A1    Jul. 17, 2014

Related U.S. Application Data

(60) Provisional application No. 61/753,154, filed on Jan. 16, 2013, provisional application No. 61/753,149, filed on Jan. 16, 2013.

(51) Int. Cl.
| | |
|---|---|
| *B63B 21/04* | (2006.01) |
| *B63B 21/56* | (2006.01) |
| *B63B 21/66* | (2006.01) |
| *B63B 22/18* | (2006.01) |
| *G01V 1/38* | (2006.01) |

(52) U.S. Cl.
CPC ............... *B63B 21/56* (2013.01); *B63B 21/66* (2013.01); *B63B 22/18* (2013.01); *G01V 1/3808* (2013.01); *G01V 1/3826* (2013.01)

(58) Field of Classification Search
CPC ........ B63B 21/56; B63B 21/66; B63B 22/18; G01V 1/3808; G01V 1/3826
USPC ........... 114/244–246, 253; 441/6, 21–23, 133
See application file for complete search history.

(56) References Cited

U.S. PATENT DOCUMENTS

| | | | | |
|---|---|---|---|---|
| 3,953,905 | A * | 5/1976 | Paitson | 441/17 |
| 4,890,568 | A * | 1/1990 | Dolengowski | 114/246 |
| 5,616,059 | A * | 4/1997 | Solomon | 441/11 |
| 6,932,017 | B1* | 8/2005 | Hillesund et al. | 114/244 |
| 8,267,031 | B2* | 9/2012 | Austad et al. | 114/244 |
| 8,817,574 | B2* | 8/2014 | Elvestad | 367/16 |
| 8,854,918 | B2* | 10/2014 | Toennessen | 367/17 |
| 2009/0283023 | A1* | 11/2009 | Welbourn | 114/39.24 |
| 2012/0048165 | A1* | 3/2012 | Westerman | 114/126 |
| 2012/0275265 | A1* | 11/2012 | Nielsen et al. | 367/20 |
| 2013/0033960 | A1* | 2/2013 | McKey, III | 367/16 |
| 2014/0200815 | A1* | 7/2014 | Hung et al. | 702/16 |

* cited by examiner

*Primary Examiner* — Daniel V Venne
(74) *Attorney, Agent, or Firm* — Patent Portfolio Builders PLLC

(57) ABSTRACT

Devices and methods for stabilizing a tailbuoy attached to a streamer towed during a marine survey are provided. The tailbuoy includes a floating body configured to be connected to the streamer, and a keel attached to the floating body. The keel is configured to stabilize a motion of the tailbuoy along a towing direction while in a working state, and to be switched between the working state in which the keel is partially submerged and a retracted state in which the keel is removed from water.

16 Claims, 7 Drawing Sheets

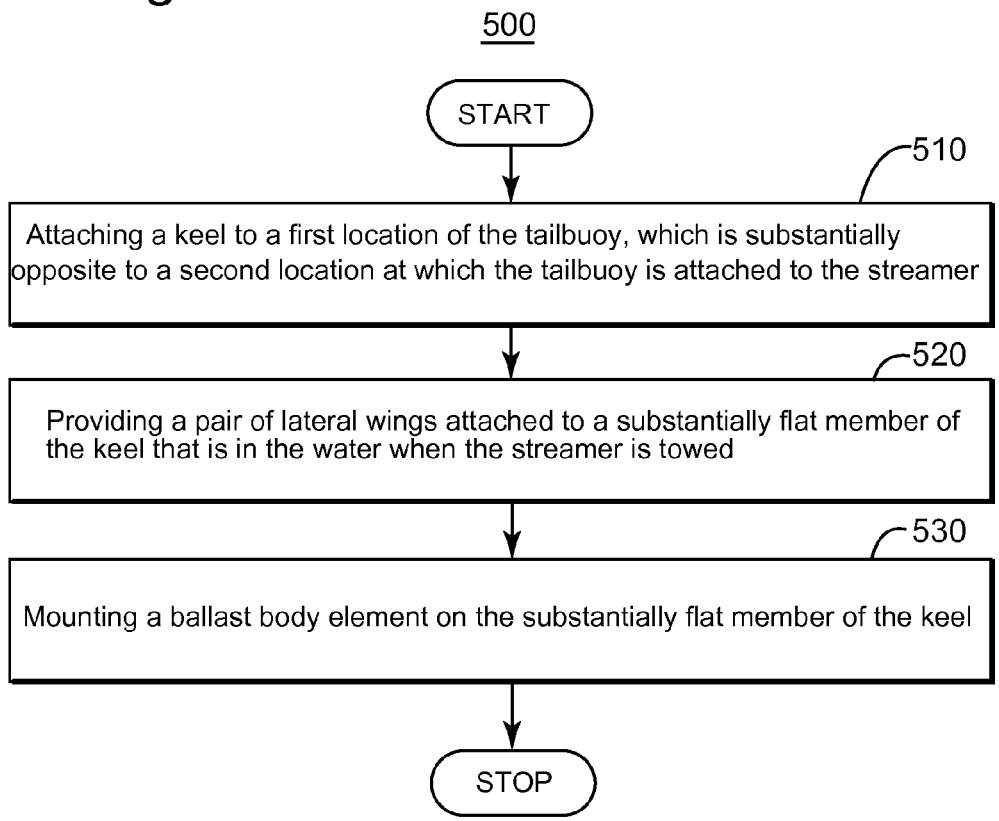

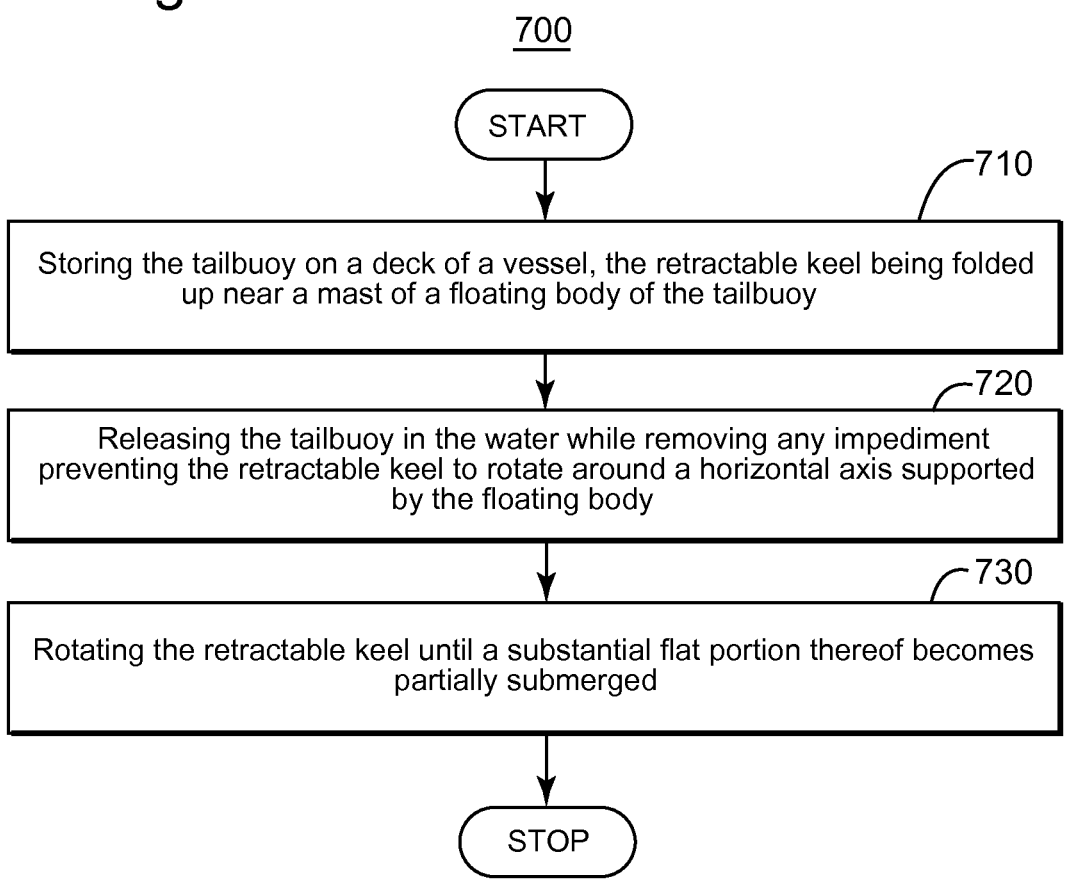

TAILBUOY STABILIZATION DEVICE AND METHOD

CROSS REFERENCE TO RELATED APPLICATIONS

This application claims priority and benefit from U.S. Provisional Patent Application No. 61/753,149 filed Jan. 16, 2013, for "Tailbuoy Stabilization Device and Method," and U.S. Provisional Patent Application No. 61/753,154 filed Jan. 16, 2013, for "Tailbuoy Stabilization Device and Method with Retractable Keel," the entire contents of which are incorporated in their entirety herein by reference.

BACKGROUND

1. Technical Field

Embodiments of the subject matter disclosed herein generally relate to methods and devices for stabilizing a tailbuoy attached to a streamer towed during a marine survey; more particularly, some embodiments are directed to or include a tailbuoy with a keel configured to decrease the tailbuoy's lateral deviations.

2. Discussion of the Background

Interest in developing new oil and gas production fields has dramatically increased in recent years. However, the availability of land-based production fields is limited, so the industry has extended drilling offshore to locations likely to hold a vast amount of fossil fuel. Marine surveys, which generate a profile (image) of the geophysical structure under the seafloor, are used to identify these locations.

During a marine survey, as shown in FIG. 1, a vessel 10 tows a seismic source (not shown) and plural streamers 20 carrying seismic detectors 22 (only one detector is labeled). The streamers 20 are deployed in a predetermined configuration (e.g., parallel to the towing direction T) and are connected to vessel 10 via lead-in cables 14. Deflectors 16 and ropes 18 are used to deploy and maintain the streamers' 20 forward ends at predetermined lateral distances there-between.

Streamers 20 may be thousands of meters long (e.g., 10 km) and are usually towed at a depth of 10 m or more. Various causes (e.g., currents, local variation) may make portions of the streamers 20 deviate from the intended configuration (e.g., deviate from towing direction T). To alleviate these deviations, one or more devices named "birds" 24 (only one bird is labeled in FIG. 1, but plural birds are illustrated) may be attached to the streamers 20. Birds are configured to maintain/adjust the depth and/or lateral position of the streamers 20. Tailbuoys 30 are attached to streamers 20 to signal the streamers' distal end positions at the water surface.

It has been observed that tailbuoys 30 are very unstable, showing frequent and abrupt lateral deviations relative to towing direction due to local effects (e.g., surface waves and currents). Further, because modern streamers may be towed deeper or have a curved profile, a streamer's distal end may reach a depth of about 30 m or more. Due to these greater depths, it becomes necessary to use longer cables to connect the streamer's distal end to the tailbuoys, which cables make larger angles with the water's surface while the streamer and tailbuoy are towed. Such changes related to the cables used to tow tailbuoys create even greater tailbuoy instability. Accordingly, it would be desirable provide a mechanism that stabilizes a tailbuoy's motion and decreases lateral deviations.

SUMMARY

Some embodiments are directed to a tailbuoy including a keel configured to stabilize taibuoy's motion along a towing direction, decreasing the taibuoy's lateral deviations. The keel may include wings further enhancing taibuoy's stability and a ballast submerged while the tailbuoy is towed. In some embodiments, the keel is retractable so that the tailbuoy may be more easily deployed, recovered and stored.

According to one embodiment, a tailbuoy is configured to be attached to the distal end of a streamer towed by a vessel. The tailbuoy has a floating body that connects to the streamer, with an attached keel configured to stabilize the tailbuoy's position perpendicular to a towing direction when the keel is in a working state. The keel is also configured to be switched between a retracted state and a working state, being partially submerged in the working state, and removed from the water in the retracted state.

According to another embodiment, a marine survey system includes at least one streamer configured to be towed and to carry survey equipment, the streamer having distal end connected to a tailbuoy. The tailbuoy includes a floating body configured to be connected to the streamer, and a keel attached to the floating body and configured to stabilize the tailbuoy when towed in a working state. The keel is configured to be switched between a retracted state and a working state. The keel is partially submerged in the working state, and removed from the water in the retracted state.

According to another embodiment, there is a method for deploying a tailbuoy with a retractable keel. The method includes storing the tailbuoy on a deck of a vessel, with the retractable keel folded up near a mast on the tailbuoy's floating body. The method further includes releasing the tailbuoy in the water while removing any impediment preventing the retractable keel from rotating around a horizontal axis supported by the floating body. The method also includes rotating the retractable keel until a substantially flat member thereof becomes partially and vertically submerged.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5, is a flowchart illustrating steps performed by a method for stabilizing a tailbuoy attached to a variable-depth streamer towed by a vessel according to an embodiment;

FIG. 7 is a flowchart illustrating steps performed by a method for deploying a tailbuoy having a retractable keel according to another embodiment.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a variable-depth streamer with an attached tailbuoy used for a marine survey. However, the embodiments to be discussed next are not limited to tailbuoys attached to variable-depth streamers, but may be applied to other streamers or situations in which it is desirable for a towed floating body to maintain a towing direction.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
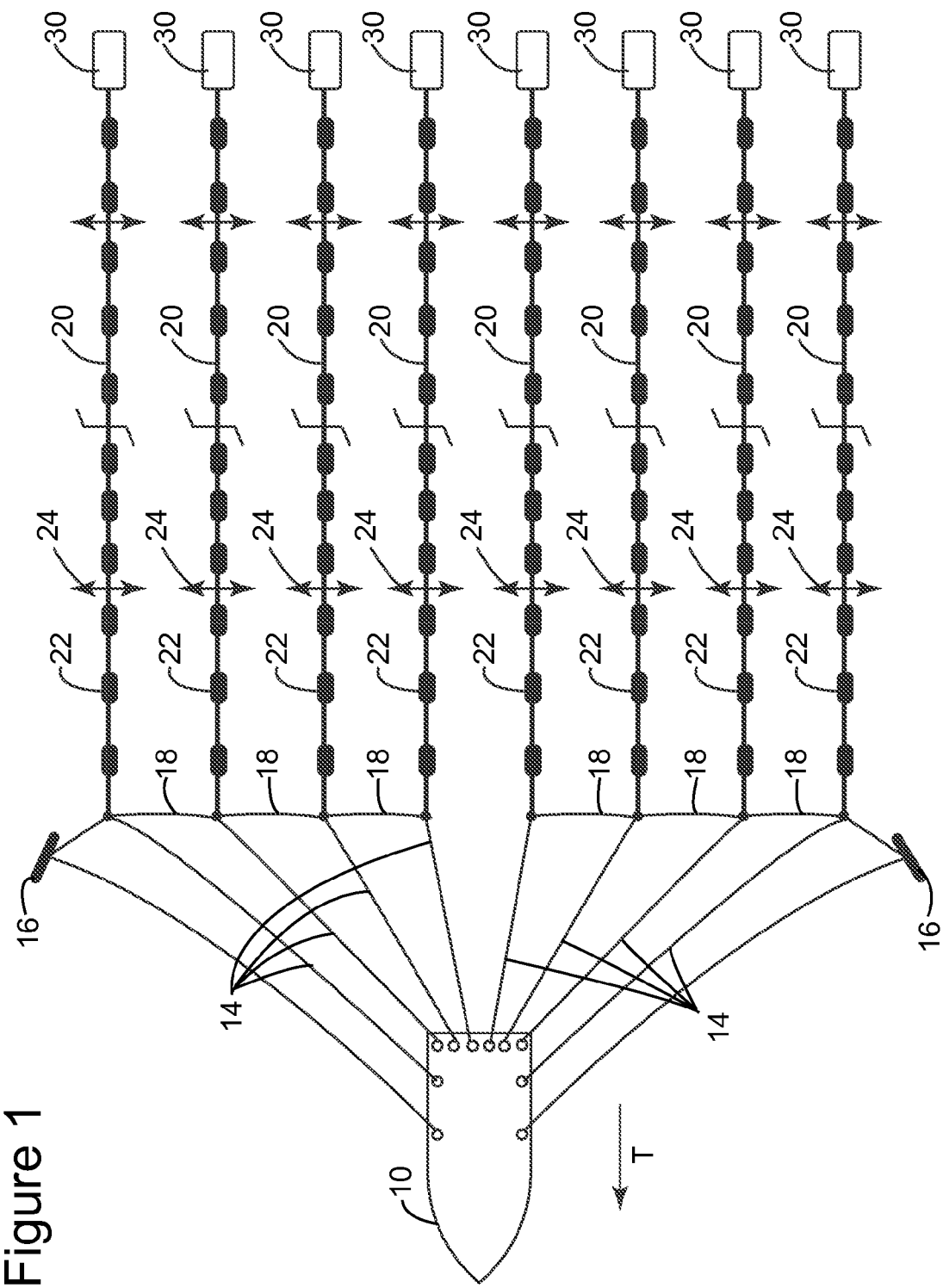
FIG. 1 is a schematic diagram of a marine survey system.
Figure 2:
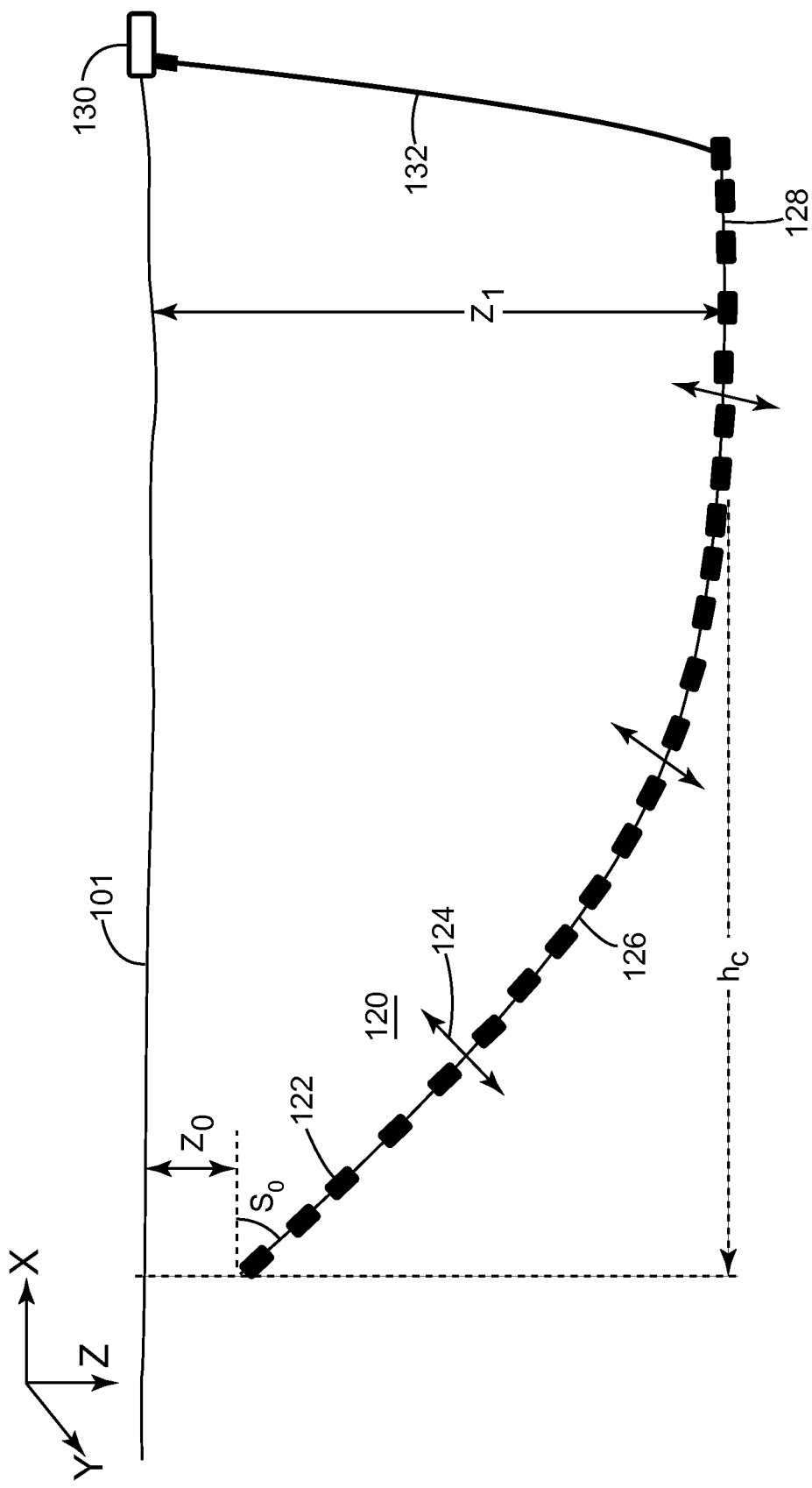
FIG. 2 is a schematic diagram of a streamer having a variable-depth profile while towed, and to which is connected a tailbuoy according to an embodiment.

As discussed above, streamers used for marine surveys are towed by one or more vessels and carry seismic detectors. The streamers may be towed while maintaining various profiles: horizontal, slanted or having a variable depth as illustrated in FIG. 2. Streamer 120 in FIG. 2 has a predetermined length (e.g., about 10 km) and carries plural detectors 122 (only one labeled) and one or more birds 124 (only one labeled). Streamer 120 is configured to flow underwater when towed with plural detectors distributed along a curved profile. The curved profile may be described as a parameterized curve, e.g., a curve characterized by (i) a depth $z_0$ (e.g., about 10 m) of a first detector measured from the water surface 101, (ii) a slope $s_0$ of a first portion of the streamer with an axis parallel with the water surface, and (iii) a predetermined horizontal distance $h_c$ between the first detector and an end of the curved profile. Note that not the entire streamer must have the curved profile. In other words, the curved profile should not be construed to always apply to the entire length of the streamer. While this situation is possible, the curved profile may be applied to only a portion 126 of the streamer. In other words, the streamer may have (i) only a portion 126 with the curved profile or (ii) a first portion 126 with the curved profile and a second portion 128 (adjacent to the first portion) with a flat profile.

A tailbuoy is attached to a distal end of the streamer to indicate the distal end's position. In some embodiments, the tailbuoy includes a keel configured to stabilize the tailbuoy's motion along a towing direction, decreasing the tailbuoy's lateral deviations. In some embodiments, the keel is retractable.

Note that although the following embodiments are related to tailbuoys, the described stabilization mechanisms may be used for other buoys attached to other equipment. In other words, the mechanism being related to tailbuoys attached to distal ends of streamers should not be construed as a limitation for the embodiments described in this document. Since the distal end of the streamer 120 may be at a greater depth (e.g., $z_1$ may be about 40 m) when the streamer has a curved profile than when it is towed at a substantially constant depth (e.g., about 10 m), tailbuoy 130 becomes even less stable because it is connected to streamer 120 via a longer cable 132 and/or the cable makes a larger angle with the water surface 101 than when the distal end is at a shallower depth. Note that the tailbuoys described in this section may be used also with a streamer towed at a substantially constant depth.

Figure 3:
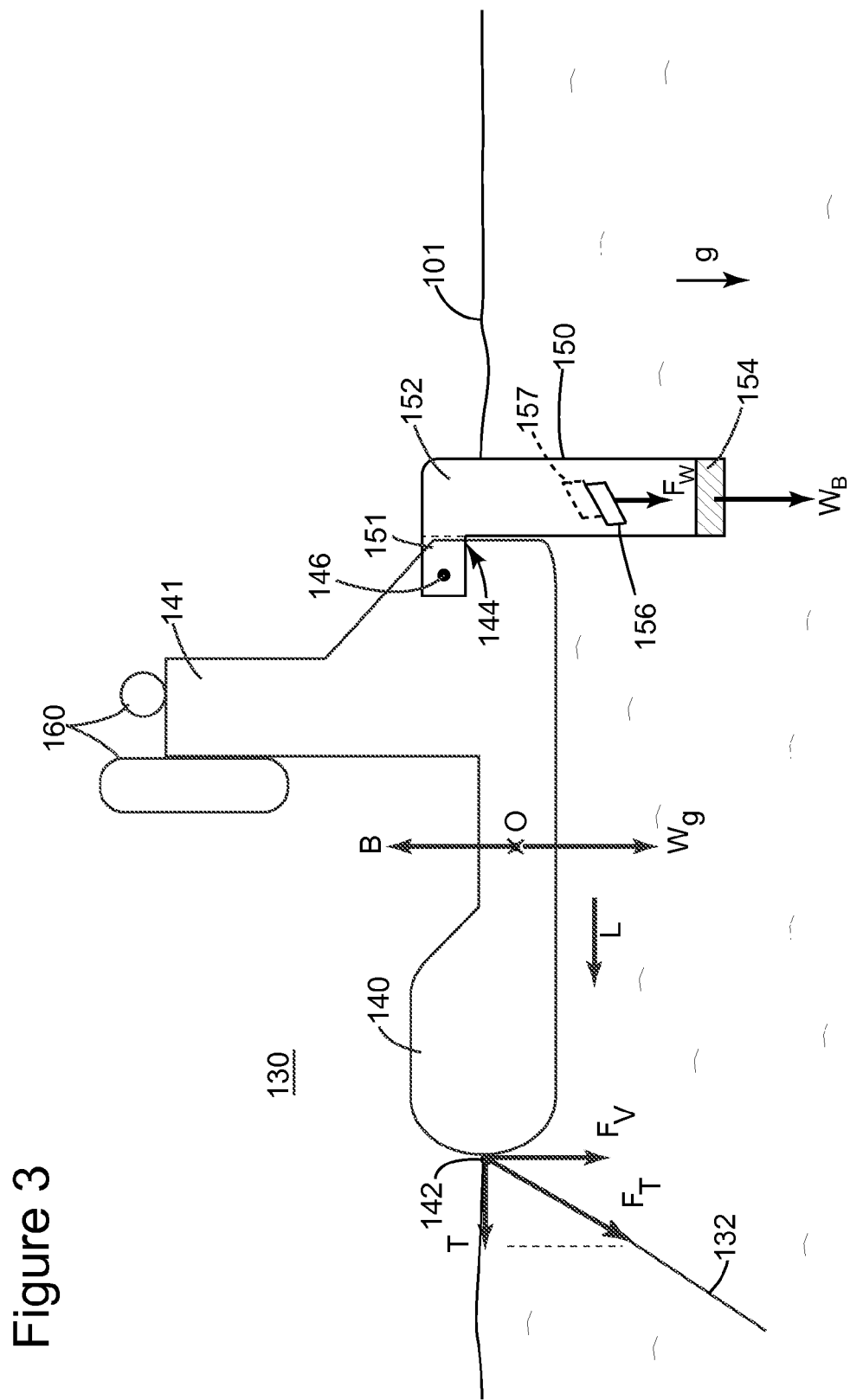
FIG. 3 is a longitudinal cross-section of a tailbuoy according to an embodiment.

As illustrated in FIG. 3, tailbuoy 130 has a floating body 140 configured to attach to the streamer and a keel 150 attached to the floating body and configured to stabilize tailbuoy 130 by opposing lateral deviations from the towing direction. Positioning equipment 160 is located on floating body 140, which may have a mast 141 extending above the water surface. Positioning equipment 160 may be mounted on mast 141. In one embodiment, positioning equipment 160 may be a Relative Global Positioning System (RGPS) receiver. Other relative or absolute positioning equipment may be used to monitor the tailbuoy's position relative to the vessel.

Keel 150 is configured to oppose lateral deviations of the towed tailbuoy from a longitudinal (towing) direction L. Keel 150 is also configured to not generate a large drag force opposite the longitudinal motion. When a solid body is pulled through a fluid, a force opposing the pulling is proportional to the body's surface in a plane perpendicular to the pulling direction.

Figure 4:
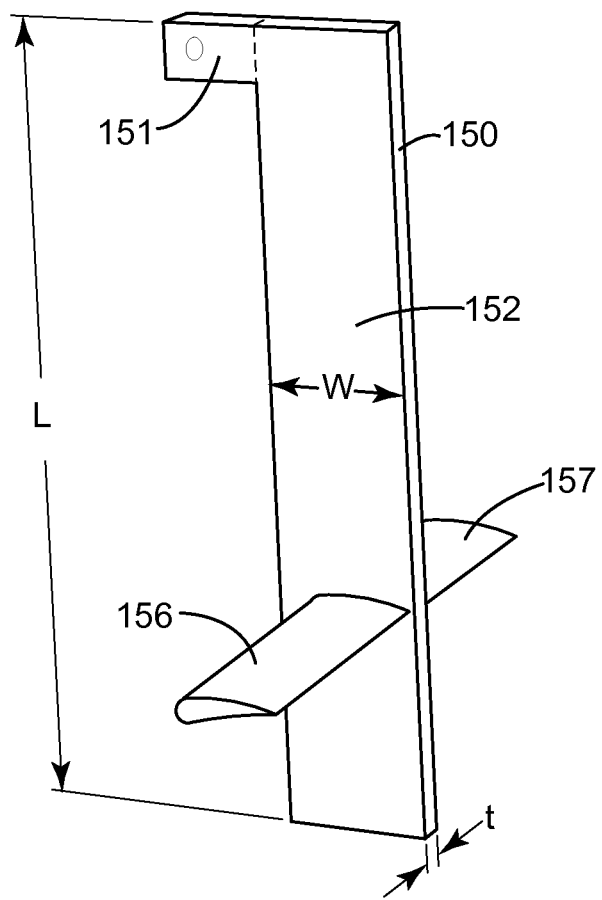
FIG. 4 is more detailed illustration of a keel of the tailbuoy according to an embodiment.

FIG. 4 illustrates in more detail keel 150, which has a substantially flat member 152 extending vertically and an attachment portion 151 (separated by an imaginary dashed line from flat member 152). Flat member 152 has a substantially rectangular shape; this shape is merely an illustration and not a limitation. Flat member 152 has a small thickness t relative to its length L and width W (thus, being properly described as "substantially flat"). Flat member 152 is partially submerged while the marine survey is performed (i.e., tailbuoy 130 is in a working state). While partially submerged, flat member 152 yields a minimal drag force because its small thickness t makes flat member 152 to have a small surface L×t perpendicular to the longitudinal (towing) direction. However, flat member 152 generates significant forces opposing lateral deviations due to its significant area L×W in a plane defined by the longitudinal direction L and the vertical (gravity) direction.

Returning to FIG. 3, tailbuoy 130 is pulled by cable 132 that connects tailbuoy 130 to the streamer towed by a vessel. Cable 132 may be attached to a front position 142 on floating body 140. A force $F_T$ transmitted via the cable causes the tailbuoy to be towed along with the streamer. Keel 150 may be attached to floating body 140 via the attachment portion 151 at a tail location 144 of floating body 140, with tail location 144 being at the opposite end of floating body 140 from front position 142, along longitudinal direction L.

Tailbuoy 130 is pushed downward by its weight $W_g$ and upward by a force B equal to the weight of the volume of water it displaces. The force $F_T$ transmitted via the cable may be viewed as a sum of a towing force T parallel to the water surface 101 and perpendicular to gravity, and a vertical force $F_v$ parallel to gravity g. Forces $F_v$, B and $W_g$ acting on vertical direction are in equilibrium (i.e., their sum is zero). If $F_v$ increases, tailbuoy 130 is pulled down, displacing a larger volume of water, which leads to a larger force B.

Force B is applied in the tailbuoy's center of gravity O and, therefore, force B generates no torque to rotate the tailbuoy. Force $F_v$ being applied toward the front position 142 generates a torque that tends to rotate tailbuoy 130 counter-clockwise around its center of gravity O. Note that the towing force T generates no torque, if front position 142 and the tailbuoy's center of gravity O are on the same horizontal line. To counterbalance the counter-clockwise rotation tendency (i.e., to cancel a torque due to $F_v$), a ballast element 154 may be placed on flat member 152 of keel 150 to generate a force $W_B$, causing a torque that favors clockwise rotation. The farther ballast 154 is from the tailbuoy's center of gravity, the greater the torque the ballast generates (for the same mass of ballast). In one embodiment, the position of ballast 154 may be adjusted (e.g., manually) within a predetermined range. In other words, for a predetermined configuration of the marine survey system (i.e., streamer profile, cable length, streamer depth), a nominal traction force $F_T$ may be estimated, and the position of the ballast may be determined to result in a null sum of torques at equilibrium. The ballast also causes the tailbuoy to return to equilibrium when the tailbuoy occasionally rotates departing from its horizontal position.

In addition to its effect on the tailbuoy as a whole discussed above, ballast 154 also creates a torque favoring the rotation of keel 150 around axis 146, which is supported by floating body 140. Axis 146 is substantially perpendicular to the longitudinal direction and gravity (vertical) direction. While in working state, keel 150 is not locked in a fixed position and is free to rotate around axis 146. Thus, the keel is in a dynamic equilibrium which leads to minimizing the drag and diminishing the likelihood of having the keel damaged by floating debris or semi-submerged obstacles. The keel's freedom to rotate allows it to rotate up when running into an obstacle and to return to its vertical position after the obstacle is overpassed. Preferably, in order to generate a larger torque and therefore to have a shorter time for the keel's return to vertical position, ballast 154 is mounted on a portion of the substantially flat member 152 farthest from axis 146, and sinks deepest when the keel is partially submerged. When switched to the retracted state, keel 150 is rotated around axis 146 to be pulled out of the water. The keel may be rotated until reaching a vertical upside-down orientation (opposite its orientation while in working position) and may be secured near the mast.

A pair of lateral wings, 156 and 157, may be mounted on opposite sides of flat member 152 (so the wings are substantially perpendicular on opposite sides of flat member 152). The wings generate a dual stabilizing effect by damping any small oscillations (rotations) of the tailbuoy around longitudinal axis L, and by generating vertical forces $F_w$. The wings may also be substantially flat. The vertical forces $F_w$ generated by the wings depend on the wings' angle with longitudinal direction L. This angle may be adjusted (e.g., manually) depending on environmental conditions (e.g., marine currents) and system configuration. When wings are present, the tailbuoy is more stable and can be used in a greater range of environmental conditions and configurations than otherwise.

A flow diagram of a method 500 for stabilizing a tailbuoy attached to a variable-depth streamer towed by a vessel is illustrated in FIG. 5. The method includes attaching a keel to a first location on the tailbuoy which is substantially opposite a second location at which the tailbuoy is attached to the streamer, at 510. The method further includes providing a pair of lateral wings attached to a substantially flat member of the keel that is partially submerged when the streamer is towed, at 520; and mounting a ballast body element on the keel's substantially flat member, at 530.

Figure 6A:
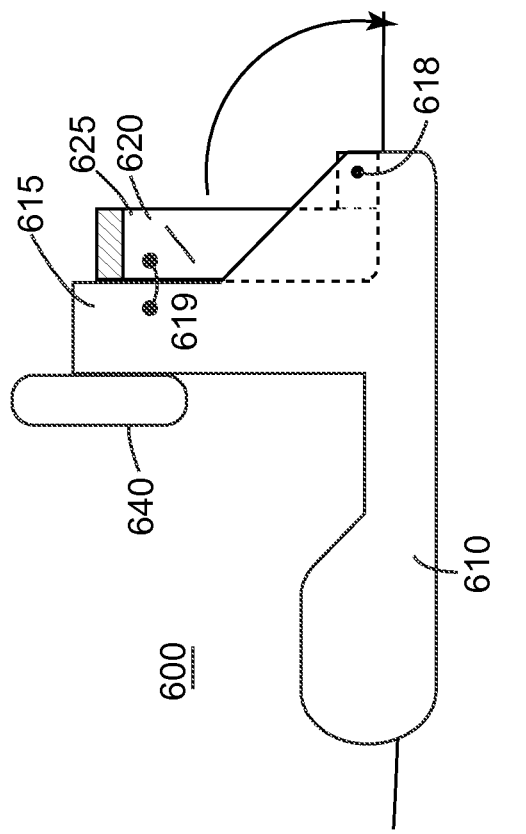
FIGS. 6A and 6B illustrate a tailbuoy with a retractable keel according to an embodiment, in a retracted state and in a working state, respectively.
Figure 6B:
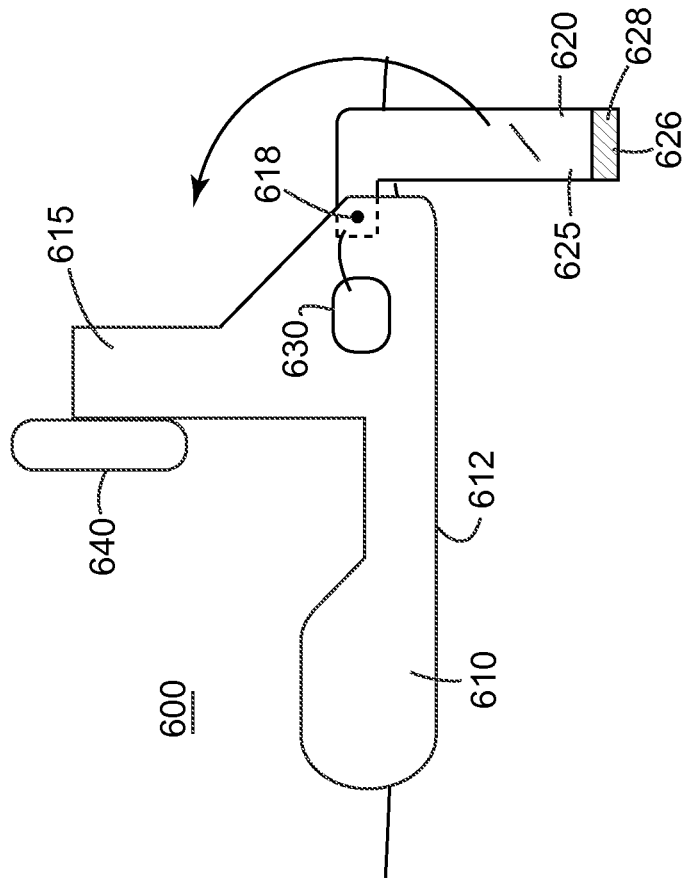

According to another embodiment, illustrated in FIGS. 6A and 6B, a tailbuoy 600 has a floating body 610 configured to connect to a streamer (not shown) and a keel 620. Floating body 610 includes a mast 615 on which positioning equipment 640 may be located. Keel 620 is attached to floating body 610 so that keel 620 may be switched between a working state (illustrated in FIG. 6A) and a retracted state (illustrated in FIG. 6B). For example, keel 620 may rotate around a horizontal axis 618 that is substantially perpendicular to a towing direction and supported by floating body 610. In the working state, flat member 625 is oriented downward so its distal edge 626 extends under a bottom side 612 of floating body 610. In the retracted state, rotated keel 620 has its flat member 625 oriented upward near mast 615. Keel 620 may be secured with a pin 619 against mast 615.

Having keel 620 folded up near mast 615 has the advantages of minimizing storage volume and protecting the keel.

Ballast 628 may be attached to flat member 625 to accelerate flat member 625 sinking in the water to reach its vertical working position. An actuation mechanism 630 may be provided to enable switching the keel from its working to its retracted position. The actuation mechanism may include a motor or may be remotely controlled. In other words, the actuation mechanism may be in communication with a remote controller, and switch the keel between the working state and the retracted state according to signals received from the remote controller.

FIG. 7 is a flowchart illustrating steps performed by a method 700 for deploying a tailbuoy having a retractable keel according to another embodiment. The method includes storing the tailbuoy on a deck of a vessel, with the retractable keel folded up near the mast on the tailbuoy's floating body, at 710. The method then includes releasing the tailbuoy in the water while removing any impediment preventing the retractable keel to rotate around a horizontal axis supported by the floating body, at 720. For example, a pin may hold the retractable keel in its folded position near the mast. The method further includes rotating the retractable keel until a substantially flat member thereof becomes partially and vertically submerged, at 730. The substantially flat member is configured and positioned to yield minimal drag force (due to its small thickness) and a large lateral force (due to is large side areas) perpendicular to the towing direction of the tailbuoy. In one embodiment, an actuation mechanism including a motor may cause the keel to rotate. In some embodiments, a ballast may be attached to the keel's substantially flat member to favor the keel's rotation in the working state. The keel may have a pair of wings mounted substantially perpendicular to the flat member thereof.

The disclosed embodiments provide methods and devices for stabilizing a tailbuoy attached to a streamer towed during a marine survey. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A tailbuoy configured to be attached to a streamer towed by a vessel, the tailbuoy comprising:
  a floating body configured to connect to the streamer; and
  a keel attached to the floating body and configured to stabilize a motion of the tailbuoy along a towing direction while in a working state,
  wherein the keel is switchable between the working state, in which the keel is partially submerged, and a retracted state, in which the keel is removed from water and raised on the floating body, and wherein, in the retracted state, the keel is secured with a pin against a mast attached to the floating body.

2. The tailbuoy of claim 1, wherein the keel is free to move while in the working state.

3. The tailbuoy of claim 1, wherein the keel has a pair of lateral wings attached to a substantially flat member.

4. The tailbuoy of claim 3, wherein an angle of the lateral wings with the towing direction is adjustable.

5. The tailbuoy of claim 3, wherein the keel has a ballast element mounted on the substantially flat member.

6. The tailbuoy of claim 5, wherein the ballast element is mounted on a portion of the substantially flat member that sinks deepest when the keel is partially submerged.

7. The tailbuoy of claim 1, further comprising:
   an actuation mechanism located on the floating body and configured to switch the keel from the working state to the retracted state.

8. The tailbuoy of claim 1, wherein the keel is configured to rotate around an axis supported by the floating body, to be folded up near a mast of the floating body when the keel is in the retracted state.

9. The tailbuoy of claim 1, further comprising a positioning equipment mounted on a floating body's mast.

10. The tailbuoy of claim 9, wherein the positioning equipment is configured to indicate tailbuoy's position relative to the vessel.

11. A marine survey system, comprising:
    a tailbuoy; and
    at least one streamer configured to be towed, carrying survey equipment and having a distal end connected to the tailbuoy,
    the tailbuoy including:
      a floating body connected to the streamer; and
      a keel attached to the floating body and configured to stabilize motion of the tailbuoy along the towing direction while in a working state,
    wherein the keel switches between the working state, in which the keel is partially submerged, and a retracted state, in which the keel is removed from water and raised on the floating body, and
    wherein the keel is secured with a pin against the mast while the keel is in the retracted state.

12. The marine survey system of claim 11, wherein the streamer has a variable depth profile.

13. The marine survey system of claim 11, wherein the keel is free to move while in the working state.

14. The marine survey system of claim 11, wherein
    the keel has a pair of lateral wings attached to a substantially flat member, and
    an angle of the lateral wings with the towing direction is adjustable.

15. The marine survey system of claim 11, wherein the keel has a ballast element mounted on a substantially flat member such that to be located below a center of gravity of the tailbuoy when the substantially flat member is partially submerged.

16. The marine survey system of claim 11, wherein the keel is configured to rotate around an axis supported by the floating body, to be folded up near a mast of the floating body while the keel is in the retracted state.

\* \* \* \* \*